US012706796B1

(12) United States Patent
Rozen et al.

(10) Patent No.: US 12,706,796 B1
(45) Date of Patent: Aug. 11, 2026

(54) DE-COUPLED SECURITY INFORMATION AND EVENT MANAGEMENT SYSTEM, AND METHOD THEREOF

(71) Applicant: Vega Cyber Solutions LTD, Tel Aviv Yafo (IL)

(72) Inventors: Eli Rozen, Tel Aviv (IL); Shay Sandler, Tel Aviv (IL); Yarin Zirlin, Tel Aviv (IL); Tony Solomonik, Tel Aviv (IL); Asaf Zoler, Tel Aviv (IL); Yarden Sasson, Tel Aviv (IL)

(73) Assignee: Vega Cyber Solutions LTD, Tel Aviv Yafo (IL)

( * ) Notice: Subject to any disclaimer, the term of this patent is extended or adjusted under 35 U.S.C. 154(b) by 106 days.

(21) Appl. No.: 18/937,323

(22) Filed: Nov. 5, 2024

(51) Int. Cl.
*H04L 41/16* (2022.01)
*H04L 41/02* (2022.01)
*H04L 41/22* (2022.01)

(52) U.S. Cl.
CPC ............ *H04L 41/024* (2013.01); *H04L 41/16* (2013.01); *H04L 41/22* (2013.01)

(58) Field of Classification Search
CPC ........ H04L 41/024; H04L 41/16; H04L 41/22
See application file for complete search history.

(56) References Cited

U.S. PATENT DOCUMENTS 9,069,930 B1 * 6/2015 Hart .................... H04L 63/1408
10,846,062 B1 11/2020 Drake et al.
10,846,342 B2 11/2020 Sharan et al.
10,853,082 B1 * 12/2020 Aleti ..................... G06F 9/3867
11,106,442 B1 * 8/2021 Hsiao ................... H04L 67/535
2004/0193912 A1 * 9/2004 Li .......................... H04L 41/08 726/14
2019/0121897 A1 * 4/2019 Edalur .................. G06F 16/244
2021/0286874 A1 * 9/2021 Jin ........................ G06F 21/577
2022/0292092 A1 * 9/2022 Brown ................ G06F 16/2246
2023/0359619 A1 * 11/2023 Sharan .................. G06F 16/283
2023/0396640 A1 * 12/2023 Miller ................ G06Q 30/0283

* cited by examiner

*Primary Examiner* — Aftab N. Khan
(74) *Attorney, Agent, or Firm* — M&B IP Analysts, LLC

(57) ABSTRACT

A system and method for the device may include determining at least one matching cyber-incident view to serve an input query when at least one matching cyber-incident view lists a plurality of target cyber data sources (CDSs), and where the matching cyber-incident is determined based on an incident that the user intends to investigate; querying each of the plurality of target CDSs, where each of the plurality of target CDSs is quired with its respective native query, where the respective native query corresponds to the input query; retrieving results from the plurality of target CDSs in response to the native queries; normalizing the retrieved results based on the matching cyber-incident view, where normalized results displayed all the retrieved results in a may include manner; and displaying the normalized results in response to the input query.

27 Claims, 6 Drawing Sheets

DE-COUPLED SECURITY INFORMATION AND EVENT MANAGEMENT SYSTEM, AND METHOD THEREOF

TECHNICAL FIELD

The present disclosure generally relates to cyber-security technologies, and more specifically, to make improvements to SIEM tools.

BACKGROUND

Security Information and Event Management (SIEM) tools are critical components in cybersecurity that provide real-time analysis and monitoring of security alerts generated by network hardware and applications. Such tools are designed to help organizations detect, analyze, and respond to security threats more effectively. SIEM tools consolidate and correlate data from various sources to provide a unified view of an organization's security posture, security threats, and the like.

Currently, available SIEM tools provide some functionality, such as log management, real-time monitoring and alerts, threat detection (based on analysis of log data), incident response, compliance reporting, and forensics.

Different vendors provide different tools, each of which may implement a subset of the functions mentioned above. Examples of popular SIEM tools include Splunk® Enterprise Security (providing analytics capabilities), IBM® QRadar (providing correlation to detect threats), ArcSight by Micro Focus, LogRhythm (providing real-time threat detection and response capabilities), AlienVault (providing integrated threat intelligence capabilities), and Microsoft® Sentinel (providing a cloud-native SIEM and SOAR (Security Orchestration, Automation, and Response) solution).

SIEM tools offer various benefits such as centralized security monitoring, improved threat detection, and faster incident response. However, these tools often struggle to streamline the process of identifying, investigating, and responding to security incidents due to the high volume of events, logs, and incidents (collectively "incidents") they report. Additionally, when multiple tools work independently within an organization, it amplifies the number of reported incidents without sharing insights among the different tools. As a result, the reported incidents are typically ignored or not treated in real time.

As SIEM tools are critical for modern cybersecurity strategies, especially in environments with high volumes of data and complex security requirements, underutilizing their capabilities may jeopardize the organization's security.

It would, therefore, be advantageous to provide a solution that would overcome the challenges noted above.

SUMMARY

A summary of several example embodiments of the disclosure follows. A system of one or more computers can be configured to perform particular operations or actions by virtue of having software, firmware, hardware, or a combination of them installed on the system that in operation cause(s) the system to perform the actions. One or more computer programs can be configured to perform particular operations or actions by virtue of including instructions that, when executed by a data processing apparatus, cause the apparatus to perform the actions.

In one general aspect, method may include determining at least one matching cyber-incident view to serve an input query, when at least one matching cyber-incident view lists a plurality of target cyber data sources (CDSs), and where the matching cyber-incident is determined based on an incident that the user intends to investigate; querying each of the plurality of target CDSs, where each of the plurality of target CDSs is quired with its respective native query, where the respective native query corresponds to the input query; retrieving results from the plurality of target CDSs in response to the native queries; normalizing the retrieved results based on the matching cyber-incident view, where normalized results displayed all the retrieved results in a may include manner; and displaying the normalized results in response to the input query. Other embodiments of this aspect include corresponding computer systems, apparatus, and computer programs recorded on one or more computer storage devices, each configured to perform the actions of the methods.

In one general aspect, non-transitory computer-readable medium may include one or more instructions that, when executed by one or more processors of a device, cause the device to: determine at least one matching cyber-incident view to serve an input query when at least one matching cyber-incident view lists a plurality of target cyber data sources (CDSs), and where the matching cyber-incident is determined based on an incident that the user intends to investigate. A non-transitory computer-readable medium may also include a query for each of the plurality of target CDSs, where each of the plurality of target CDSs is quired with its respective native query, where the respective native query corresponds to the input query. Medium may furthermore include retrieving results from the plurality of target CDSs in response to the native queries. Medium may in addition include normalizing the retrieved results based on the matching cyber-incident view, where normalized results displayed all the retrieved results in a may-include manner. The medium may moreover include a display of the normalized results in response to the input query. Other embodiments of this aspect include corresponding computer systems, apparatus, and computer programs recorded on one or more computer storage devices, each configured to perform the actions of the methods.

In one general aspect, the system may include one or more processors configured to: System may also include determining at least one matching cyber-incident view to serve an input query when at least one matching cyber-incident view lists a plurality of target cyber data sources (CDSs), and where the matching cyber-incident is determined based on an incident that the user intends to investigate. System may furthermore include a query for each of the plurality of target CDSs, where each of the plurality of target CDSs is quired with its respective native query, where the respective native query corresponds to the input query. System may in addition include retrieving results from the plurality of target CDSs in response to the native queries. System may moreover include normalizing the retrieved results based on the matching cyber-incident view, where normalized results displayed all the retrieved results in a may-include manner. System may also include a display of the normalized results in response to the input query. Other embodiments of this aspect include corresponding computer systems, apparatus, and computer programs recorded on one or more computer storage devices, each configured to perform the actions of the methods.

Implementations may include one or more of the following features. System where the one or more processors are further configured to: prompt a large language model to determine the at least one matching cyber-incident view.

Implementations of the described techniques may include hardware, a method or process, or a computer tangible medium.

BRIEF DESCRIPTION OF THE DRAWINGS

The subject matter disclosed herein is particularly pointed out and distinctly claimed in the claims at the conclusion of the specification. The foregoing and other objects, features, and advantages of the disclosed embodiments will be apparent from the following detailed description taken in conjunction with the accompanying drawings.

DETAILED DESCRIPTION

Figure 1:
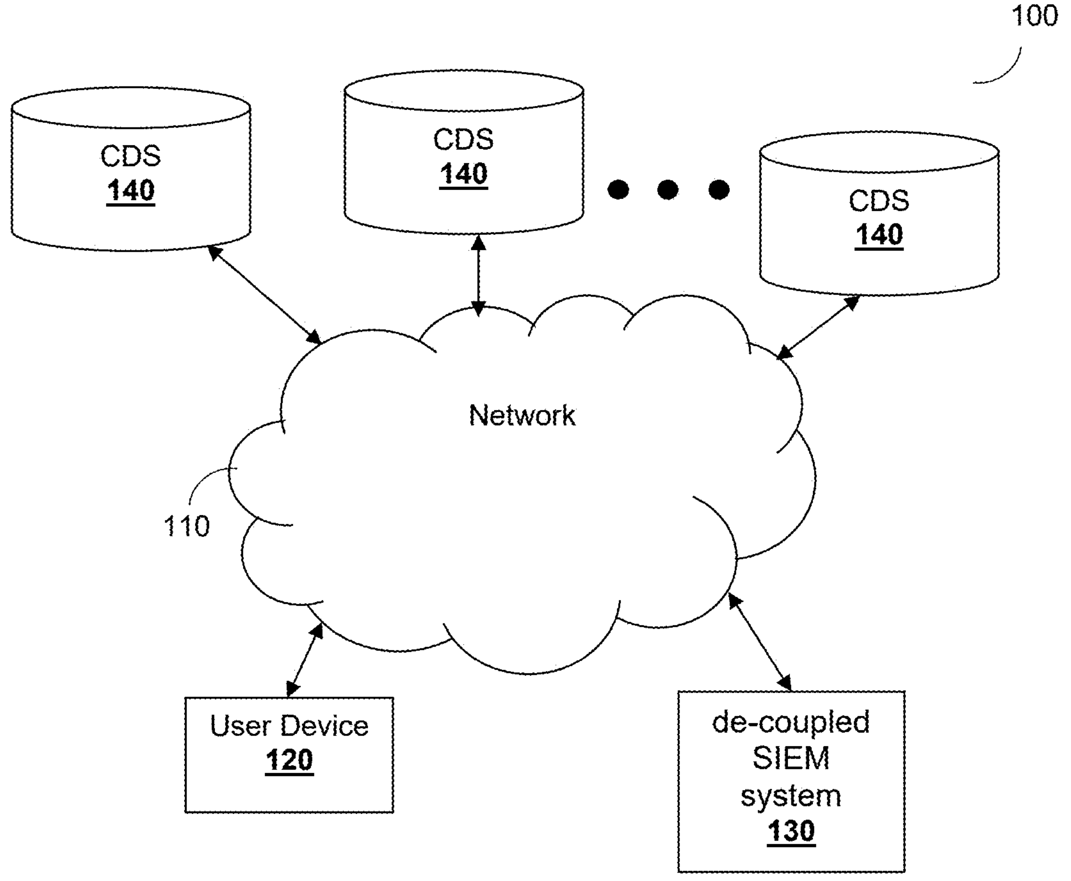
FIG. 1 shows an example network diagram utilized to describe the various disclosed embodiments.

The various disclosed embodiments include a method and system for performing a federated search across multiple different SIEM tools. The disclosed system may be configured to determine at least one matching cyber-incident view to serve an input query. The matching cyber-incident view lists a plurality of target cyber data sources (CDSs). In an embodiment, the matching cyber-incident is determined based on an incident that the user intends to investigate. The disclosed system may be configured to query each of the plurality of target CDSs, where each of the plurality of target CDSs is queried with its respective native query, which corresponds to the input query. The system is further configured to retrieve results from the plurality of target CDSs in response to the native queries and normalize the retrieved results based on the matching cyber-incident view, where normalized results display all target CDSs' results in a normalized format. The results in a normalized format are displayed in response to the input query. In an embodiment, the disclosed system also maps the results from CDSs to an intermediate format using the intermediate view and maps the results from the intermediate format to the normalized format using the normalized view.

The disclosed system is configured to reduce the amount of data generally provided by the CDSs (e.g., SIEM systems) by querying only CDSs relevant to the input query. Further, the results returned by the CDSs are correlated such that only data pertaining to the input query is disclosed. In addition, unmodified results allow a user to submit the input query to quickly analyze the results as there is no need to understand how the data is stored in the particular CDSs.

Reducing the amount of data (results) and further displaying such in a normalized (and unified) manner allows for the reduction of alert fatigue and efficiently investigates cyber incidents associated with an alert for which a ticket is generated. Furthermore, reducing the amount of data displayed, i.e., by instead displaying all retrieved results from CDSs, allows a reduction in rendering, which allows saving power used by a processing circuitry configured to perform the rendering.

In this regard, it is recognized that a human can manually query each CDS and analyze the results independently. However, this would require the user (human) to apply subjective criteria to determine which CDSs to query and which results should be analyzed or ignored. Furthermore, different users may apply different subjective criteria, resulting in even more disparity in the results being analyzed. The disclosed system solves this, in an embodiment, by at least applying predefined objective criteria to determine which CDSs to query and how to unify the results, thus generating reliably consistent results to an input query.

Further, the disclosed system improves the security of the organization. The ability to query multiple CDSs and review the results in an intuitive manner would allow a user (e.g., a security researcher) to act on detected incidents quickly. The alternative, as provided today, does not allow a user to act and investigate an incident across multiple CDSs.

Furthermore, due to the high volume of events, logs, and incidents that CDSs report, it is impossible for a human to review and analyze all events, logs, and incidents reported by multiple tools in real-time. As such, a hacker may exploit a cybersecurity weakness, vulnerability, and the like, which is why speed is of the essence.

Furthermore, correlating and unifying results (events, logs, and incidents) can achieve a reduction in memory usage, as there is no need to store in memory data relating to each of the plurality of tickets. Thus, the results generated by the disclosed embodiments can be stored in a storage or a local memory.

FIG. 1 shows an example network diagram 100 utilized to describe the various disclosed embodiments. In the example network diagram 100, a user device 120, a de-coupled SIEM system (hereinafter "System") 130, and a plurality of cyber data sources (CDSs) 140-1 through 140-N(hereinafter referred to individually as a CDS 140 and collectively as CDSs 140, merely for simplicity purposes) communicate via a network 110. The network 110 may be but is not limited to, a wireless, cellular, or wired network, a local area network (LAN), a wide area network (WAN), a metro area network (MAN), the Internet, the World Wide Web (WWW), similar networks, and any combination thereof.

The user device (UD) 120 may be but is not limited to, a personal computer, a laptop, a tablet computer, a smartphone, a wearable computing device, or any other device capable of receiving and displaying notifications. A user operating user device 120 can query the system to retrieve any information, including reports, analytics, events, logs, and the like stored in the CDSs 140.

CDSs 140 may store logs from various sources like firewalls, servers, applications, and network devices in an organization protected by system 130. CDSs 140 may further store or provide detailed reports and data for forensic analysis and/or alerts on cyber incidents. A CDS 140 may include but is not limited to, SIEM tools, data lakes, data storage devices, and the like. Examples for CDSs 140 include SIEM tools, such as Splunk® Enterprise Security, ArcSight by Micro Focus, LogRhythm, AlienVault, Microsoft® Sentinel, and the like. A CDS 140 realized as a data lake is a centralized repository for storing structured and unstructured data at any scale. Unlike traditional databases that store data in structured formats, a data lake can store raw data, which can be processed later according to different needs. The cyber data stored in a data lake may include logs, incidents, and the like. A CDS 140 may be a storage, such as a database including structured data, a cloud storage, and the like.

Each CDS of the CDSs 140 may be provided by different vendors and, as such, may store different types of data in different formats. Further, CDSs 140 can be connected and accessed differently. For example, some CDSs may be quired with SQL, some CDSs may be quired with a priority query language, and some CDSs may be accessed and quired via API.

Figure 2:
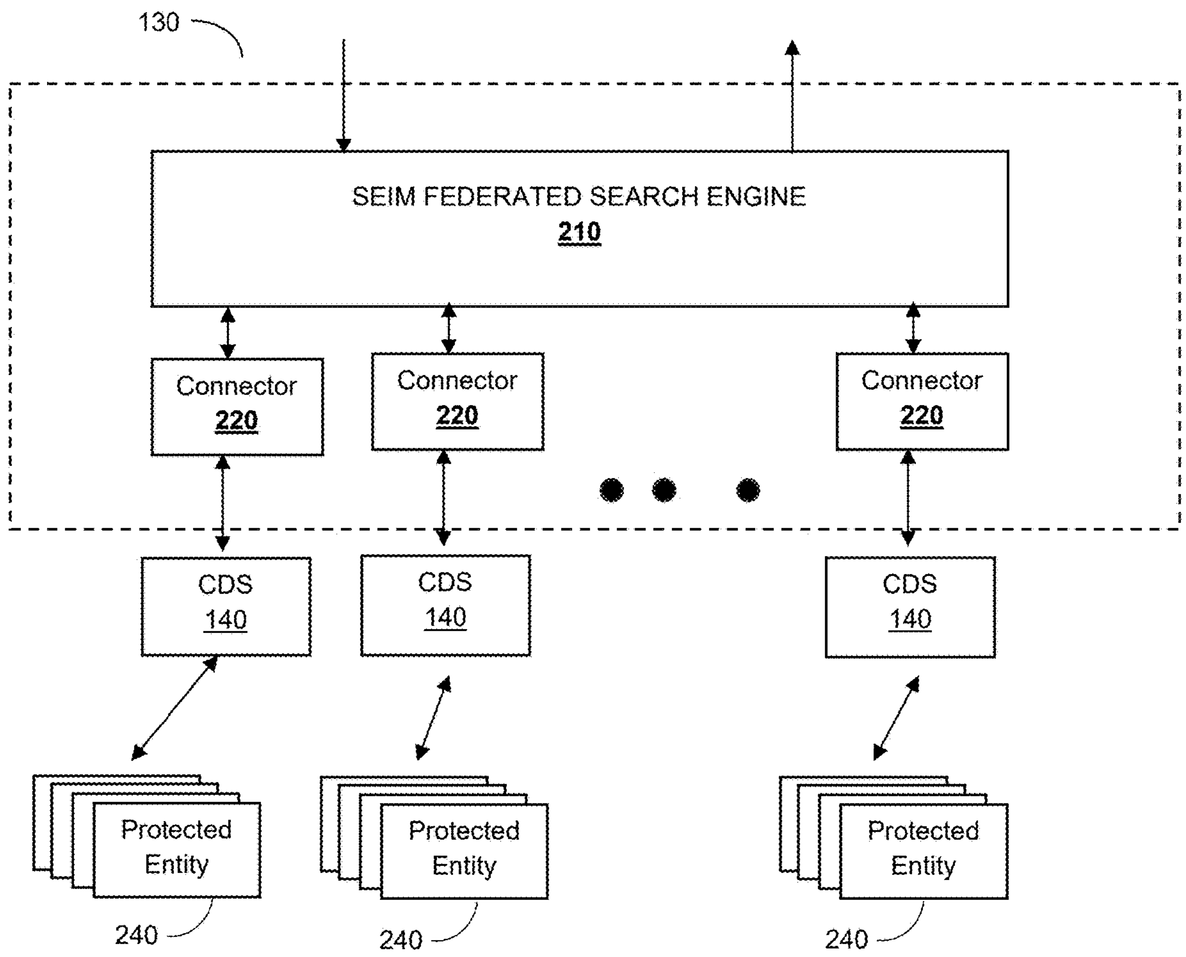
FIG. 2 shows an example diagram demonstrating the operation of a system executing the federated search according to disclosed embodiments.

System 130 may include a plurality of connectors (shown in FIG. 2). Each connector allows the connection with a target CDS 140 according to a protocol and/or query language implemented by the CDS. A connector may be realized in software, firmware, hardware, or a combination thereof. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by a processing circuitry, cause the processing circuitry to operate the connector.

A CDS 140 (e.g., a SIEM tool) typically consolidates alerts, logs, or events received or captured from protected entities, such as servers, databases, networks, and computers to provide a normalized view of an organization's security posture. However, CDSs 140 operates independently, and a user of UD 120 cannot retrieve reports from two different CDSs. As a result, incidences or other information from such reports cannot be correlated or searched. In other words, current CDSs 140 cannot provide reports, analyses, insights, and such across multiple CDSs 140. This limitation reduces the amount of information that can be processed by a user, such as a security information officer, and consequently compromises the overall security of the organization.

According to the disclosed embodiments, system 130 provides a federated search across all data stored, maintained, or otherwise processed by CDSs 140. That is, for example, system 130 provides a federated search across multiple different SIEM tools.

Federated search is a type of search technology that enables users to search multiple data sources at the same time through a single search interface. Instead of searching each data source separately, federated search systems gather results from different databases, indexes, or repositories and present them to the user in a consistent format. According to the disclosed embodiments, using a user device 120, a user can input a single query to search multiple CDSs 140. This query can be an SQL query or a natural language query. Moreover, in system 130, search results from different CDSs 140 are presented in a normalized format, despite the fact that the CDSs maintain data with different formats, structures, and protocols. Thus, system 130 allows heterogeneous data handling from CDSs 140. In another embodiment, system 130 executes queries in real time.

Therefore, in contrast to existing SIEM tools and solutions, system 130 allows at least search and correlation data from multiple CDSs and consequently improves the overall security of the organization. Further, system 130 allows querying data directly from APIs, and therefore there is no need to store data locally.

It should be noted that system 130 can be deployed either in the cloud computing environment or on-premises, depending on the organization's needs, resources, and preferences. The cloud computing environment can be a public, private, or hybrid cloud. Examples of public cloud computing environments include Amazon® Web Services (AWS), Microsoft® Azure, or Google® Cloud Platform (GCP), which offer shared infrastructure managed by the cloud provider, providing scalability, flexibility, and reduced infrastructure management. On-premises deployment involves hosting system 130 on the organization's servers and infrastructure, giving the organization complete control over the environment but also requiring more management and maintenance effort. This option is often chosen for systems with strict security or compliance requirements.

It should be understood that the embodiments described herein are not limited to the specific arrangement illustrated in FIG. 1, and other arrangements may be equally used without departing from the scope of the disclosed embodiments.

FIG. 2 shows an example diagram demonstrating the operation of system 130 executing the federated search according to disclosed embodiments. As illustrated in FIG. 2, system 130 includes a SIEM federated search engine 210 (or simply "search engine" 210) and a plurality of connectors 220. Each connector 220 provides connectivity to a CDS 140. A connector 220 allows querying or providing API requests to the respective CDS 140 according to the protocol implemented by the CDS 140.

As noted above, a CDS 140 may include an SIEM tool, a data lake, a storage device, a database, and the like. Different vendors may provide CDSs 140, and as such, data in one CDS may be saved, indexed, maintained, or retrieved in a different way. For example, a CDS 140 may include a Splunk® SIEM, which can be queried using a proprietary query language known as SPL. The SPL is defined and operated differently than an SQL.

According to the disclosed embodiments, connectors 220 are designed to interface between an input query entered by a user and the proprietary protocol implemented by the respective CDS 140. The input query may be in an SQL or natural language.

A CDS 140 may monitor protected entities in an enterprise environment to provide cyber security functionality, such as log management, real-time monitoring and alerts, threat detection (based on analysis of log data), incident response, compliance reporting, and forensics. Each CDS 140 may provide a different set of functions and monitor or otherwise control a different set of protected entities.

A protected entity (collectively labeled as 240) may be deployed in a cloud computing environment or on-premises. Furthermore, it may be a physical or virtual entity. Examples of protected entities include virtual machines (VMs), virtual networks, virtual storage, containers, firewalls, load balancers, servers, databases (physical and virtual), end-point devices, and so on.

According to the disclosed embodiments, a user may select a set of target CDSs 140 to connect to. To this end, search engine 210 instantiates respective connectors 220 associated with the selected CDS 140. The connection between a connector 220 and a CDS 140 would require the credentials of the CDS 140.

Upon establishing a connection between CDS 140 and connector 220, search engine 210 retrieves information on what and how data is stored or maintained by each target CDS 140. For example, search engine 210 may retrieve information database schemas, indexes, data formats, data types, and the like. As a further example, a database schema is the blueprint or architecture of a database that defines how data is organized, stored, and managed. It provides a formal structure for the database, specifying the tables, fields, relationships, and constraints within the database. Thus, retrieving the database schema allows the search engine 210 to determine what data is managed and how it is managed.

Using the retrieved information 210, one or more cyber-incident views are generated. In SQL, a view is a virtual table that is based on the result of a SQL query. Unlike a real table, a view does not store data itself. Instead, the view dynamically generates data by executing the query whenever the view is accessed. This allows you to encapsulate complex queries, simplify data access, and enforce security by restricting access to specific data.

According to the disclosed embodiment, cyber-incident views are SQL views that pertain to the detection and/or investigation of cyber incidents. A cyber-incident view encapsulates a query or queries that can be submitted to a plurality of CDSs 140. That is, a cyber-incident view is limited to data that can be retrieved from multiple CDSs 140.

In some example embodiments, cyber-incident views can encapsulate a query or queries to retrieve information on threat detection, security incidents, compliance, user activity monitoring, network traffic analysis, vulnerability management, and the like. Examples of cyber-incident views include malware infections, unauthorized access or authentication attempts, data exfiltration, anomalous login attempts, unusual network traffic, suspicious file transfers, audit trails for user activity, data access logs, compliance status checks, anomalous login attempts, unusual network traffic, suspicious file transfers, audit trails for user activity, data access logs, and compliance status checks, privileged user activities, failed login attempts, unusual access patterns, data exfiltration attempts, DDOS attacks, and communication with command-and-control servers, known vulnerabilities in the environment, and risk assessments, system changes, user behavior anomalies, security posters, and the like.

The types of cyber-incident views to be utilized by search engine 210 may be generated or predetermined. As each view should query data from multiple sources, the mapping between such sources to the required result may be performed by an AI process. A source may include, for example, one or more tables in a CDS 140. Such an AI process analyzes the retrieved information on how and what each CDS stores and maps various tables (or data locations) across CDSs to result in the required views. An AI process for generating cyber-incident views is discussed below.

As an example, a cyber-incident view has failed authentication attempts in the last month. Such information is maintained in an authentication table in Splunk®, and authentication logs into the GitHub® repository. Such a cyber-incident view will map the relevant columns in the Splunk® authentication logs and fields in the audit logs in the GitHub® repository. The mapping will be mapped to a new table, "authentication table," in a normalized format that would represent relevant information from both sources. In an embodiment, the normalized format is an open cybersecurity schema framework (OCSF).

This example cyber-incident view "views.ocsf.authentication" can be represented as follows:

```
CREATE VIEW views.ocsf.authentication AS
SELECT * FROM views.splunk.authentication_logs
UNION ALL
SELECT * FROM views.github.audit_logs;
```

The section is from two different views querying Splunk® authentication logs and GitHub® Audit logs. The SQL statement used is UNION ALL (a command that combines the result set of two or more SELECT statements).

According to the disclosed embodiments, when a user enters a query, the related cyber-incident view is detected or determined, and the query is used to identify the target CDSs to retrieve the results. Following the above example, the target CDSs are Splunk® and GithHub®, and their sources to be queried using native queries are Splunk.default.index and github_api.get.audit_log, respectively. It should be noted that GitHub® is queried (or accessed) through REST API.

Then, search engine 210 generates the native queries to be sent to the target CDSs via the respective connector 220. A connector 220 may convert the generated query to a format supported or complied with by the target CDS (from SPL for Splunk®).

The results received by the search engines are correlated to, for example, removing duplicated entries, including only required columns (fields), and normalizing the data to a normalized format, e.g., OCSF-normalized format.

This process implemented by search engine 210 can be realized as an Extract, transform, and load (ETL) data pipeline planned and run at query time by the SQL engine, utilizing multiple SQL views up to the data sources to be queried. Each row is streamed through the various cyber-incident views and normalized to a predefined normalization format (e.g., OCSF) for each CDS the customer has configured.

Figure 3:
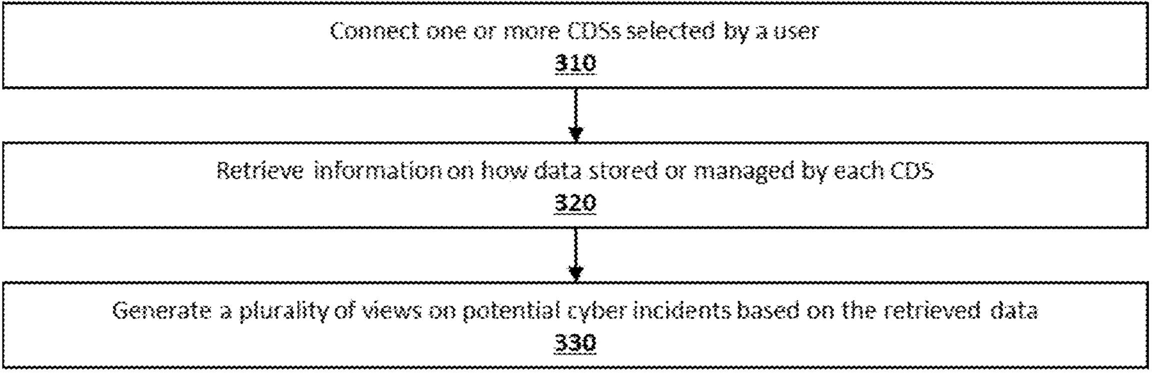
FIG. 3 is an example flowchart of an example process for presetting search engines with cyber-incident views according to an embodiment.

FIG. 3 is an example flowchart of an example process 300 for presetting search engines with cyber-incident views according to an embodiment. In some implementations, one or more process blocks of FIG. 3 may be performed by system 130.

At S310, connections are established with a plurality of CDSs. In an embodiment, such CDSs are selected by a user, and the connections are allowed by providing the appropriate credentials. As noted above, connections between CDSs and search engines (210, FIG. 2) can be facilitated by connectors, such as connectors 220 shown in FIG. 2.

At S320, from each connected CDS, information on data stored or managed by each CDS is retrieved. It should be noted that not that actual data stored or managed by a CDS is retrieved but rather information on the type of data and its structure. In an embodiment, S320 may include obtaining a database schema, an index, a data format, a data type, and the like of each CDS.

At S330, a plurality of cyber-incident views is generated based on the retrieved information. A cyber-incident view encapsulates a query or queries that can be submitted to some or all of the plurality of connected CDSs. In an embodiment, S330 may be performed by an AI process that maps sources in CDSs, to provide the required results. A source may include, for example, a table, a log file, and the like within a CDS. That is, in an example embodiment, S330 includes analyzing the retrieved information on how and what each CDS stores and maps various sources (or data locations) across CDSs to result in the required cyber-incident views. Various examples of cyber-incident views are provided above.

In an embodiment, the cyber-incident views also define how to normalize the retrieved data from the multiple CDSs into an OCSF format. In an embodiment, a cyber-incident view includes an intermediate view that allows the mapping format of how data is stored in each CDS to a format utilized by an entity (e.g., protected entity) reported the data (e.g., log) to the CDSs. The cyber-incident view also includes an OCSF-view mapping from the intermediate format to the OCSF. In an embodiment, mapping the results to an intermediate view also includes correlating the results to remove duplicated entries, including only required columns (fields). This would allow reducing the amount of uncertain data displayed to the user.

For example, the entity would be a CrowdStrike® device having a log format "A". The logs from the CrowdStrike® device are stored in Splunk® having a log format "B", and Microsoft® Sentinel has a log format "C". According to this example, the intermediate view may be mapping logs' fields from formats B and C to format A. According to this embodiment, there is a mapping between format A (provided by the intermediate view) to an OCSF. It should be noted that an OCSF is one example of a standardized format, and another standardized format may be applicable as well.

The following example is a number of code lines that illustrate an intermediate view for mapping from CrowdStrike® device events to a Splunk® format:

```
CREATE OR REPLACE VIEW views.default.crowdstike_events AS SELECT
  raw,
  timestamp,
  CAST(json_extract_scalar(raw, '$["LogonType"]') AS INTEGER) AS LogonType,
  CAST(json_extract_scalar(raw, '$["LogonServer"]') AS VARCHAR) AS LogonServer,
  CAST(json_extract_scalar(raw, '$["id"]') AS VARCHAR) AS id,
  CAST(json_extract_scalar(raw, '$["SubStatus"]') AS VARCHAR) AS SubStatus,
```

Following is an example demonstrating a number of code lines of an OCFS-view mapping from the CrowdStrike® device intermediate view:

```
CREATE OR REPLACE VIEW views.default.crowdstrike_ocsf_
authentication AS SELECT
  timestamp,
  '{{ .data_source }}' as data_source,
  '{{ source }}' as source,
  '{{ .storage }}' AS storage,
  'Authentication' as class,
  json_object(
    'type_uid' : CASE
      WHEN event_simpleName = 'UserLogon' OR event_simpleName =
'UserLogonFailed' OR event_simpleName = 'UserLogonFailed2' THEN
300201
      WHEN event_simpleName = 'UserLogoff' THEN 300202
      ELSE 300200
    END
```

The cyber-incident views are generated using an AI process, including the Retrieval-Augmented Generation (RAG) process, and tuning the generated views using an AI model. RAG is a method that combines large language models (LLMs) with external information retrieval systems to improve the generation of more accurate and contextually relevant responses. In an embodiment, when implementing RAG, the formats used by the CDSs, entities, and OCSF are retrieved from their respective repositories. Such repositories may include the CDS, protected entities, databases that contain such information, search engines, document stores, and the like. Further, the example logs can be retrieved from the same or other repositories.

The RAG process augments one or more prompts by adding the information retrieved from various formats and log examples. In an embodiment, various prompt engineering techniques are used to create an accurate prompt to feed an LLM. The augmented prompt allows the large language models to generate accurate views. In an example embodiment, the argumentation step can be performed separately for prompts engineered to create the intermediate views and prompts engineered to generate OCSF views.

In the generation steps, the RAG process feeds the generated prompts to an LLM to provide the cyber-incident views. As noted above, each cyber-incident view includes an intermediate view and an OCSF view. The LLM used or prompted by the RAG model may include any of the following: GPT-3, GPT-4, T5 BART, FLAN-T5, LLAMA, LaMDA, PaLM, Bloom, and the like.

In an embodiment, the output of the RAG process may be tuned by an AI process designed to detect inaccuracy in views generated by the RAG process. Such an AI model may be designed to identify any words that are not compliant with the allowed strings in any of the formats mentioned above. For example, LogonServer is a known field in Splunk®. If the RAG process generates a view with a field name Server Logon instead of LogonServer, this would be flagged by the AI model.

It should be appreciated that formats discussed above can be any schema, file, and the like describing how the data is arranged in a database or an API. Examples of such may include, but are not limited to, SQL Files, Entity-Relationship Diagram (ERD) Files, JSON Schema Files, YAML Files, XML Schema Definition Files, RAML Files, OpenAPI/Swagger Specification Files, API Blueprint Files, and the like.

It should be that logs discussed above may include events, signals, alerts, reports (textual and visual), or any output provided by the CDSs.

Although FIG. 3 shows example blocks of process 300, in some implementations, process 300 may include additional blocks, fewer blocks, different blocks, or differently arranged blocks than those depicted in FIG. 3. Additionally, or alternatively, two or more of the blocks of process 300 may be performed in parallel.

Figure 4:
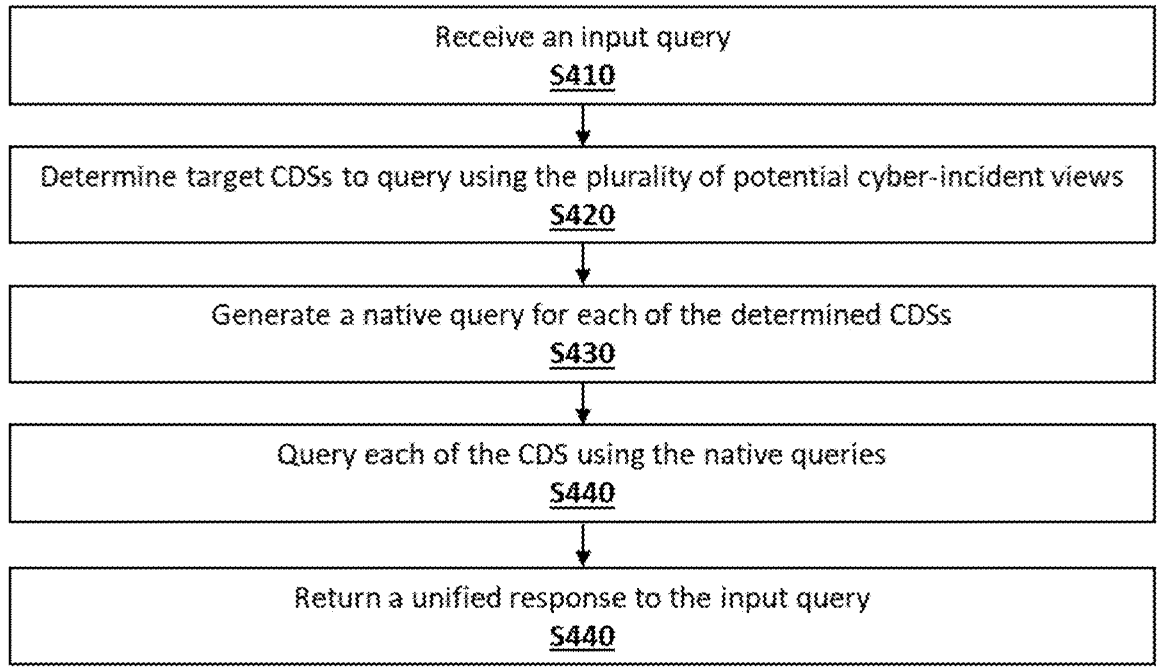
FIG. 4 is an example flowchart of an SIEM federated search process according to an embodiment.

FIG. 4 is an example flowchart 400 of an SIEM federated search process according to an embodiment. In some implementations, one or more process blocks of FIG. 4 may be performed by a system 130.

At S410, an input user query is received. The input user query may be in a format of an SQL query or a natural language query. A natural language query, when received, is transformed into an SQL query. An input user query is entered by a user attempting to retrieve information from multiple SIEM tools and other repositories using a single query. Thereby, the SQL query allows decoupling from a specific SIEM tool or system by enabling querying and retrieving information from a plurality of SIEM tools.

At S420, a matching cyber-incident view to serve the input user query is determined. The matching cyber-incident view defines the target CDSs. For example, the example cyber-incidents view "views.ocsf.authentication" defines Splunk® and GitHub®. The matching cyber-incident view may be identified based on an incident that the user intends to investigate. Such intent can be derived from the SQL query. In an embodiment, the input query may designate the matching cyber-incident view. In an embodiment, determining the matching cyber-incident view includes analyzing the input query to determine user intent for requested results for the incident to be investigated and identifying a cyber-incident matching the user purpose for requested results. This may be achieved by, for example, prompting a large language model to determine the one cyber-incident view. There may be more than one matching cyber-incident view. In an embodiment, CDSs are connected to the system 130 prior to receiving the input user query.

At S430, for each identified target CDS, a native query is generated. The native query is in a format that is compliant with the target CDS and designates the source (e.g., log file, a table) of data within the CDS. In an embodiment, a native query may include a REST API request. An example of a native query submitted to GitHub® may include:

```
SELECT 'Github' AS data_source functions.
FROM github_api.get.audit_log
WHERE type = 'Login' OR type = 'Logoff;
```

At S440, each native query is sent to the respective target CDS for execution. In an embodiment, the native queries are sent through the connectors, such as connectors 220 shown in FIG. 2.

At S450, the returned results from target CDSs (in response) are processed and displayed or reported to a user submitting the input query. In an embodiment, S450 includes receiving, but the search engine, results returned from each native query, correlating the results to, for example, remove duplicated entries or irrelevant returned data entries, merge entries, and the like. S450 may further include normalizing the (processed or correlated) results to provide a normalized response to the input query. In an example embodiment, the normalized response may be generated as an OCSF.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
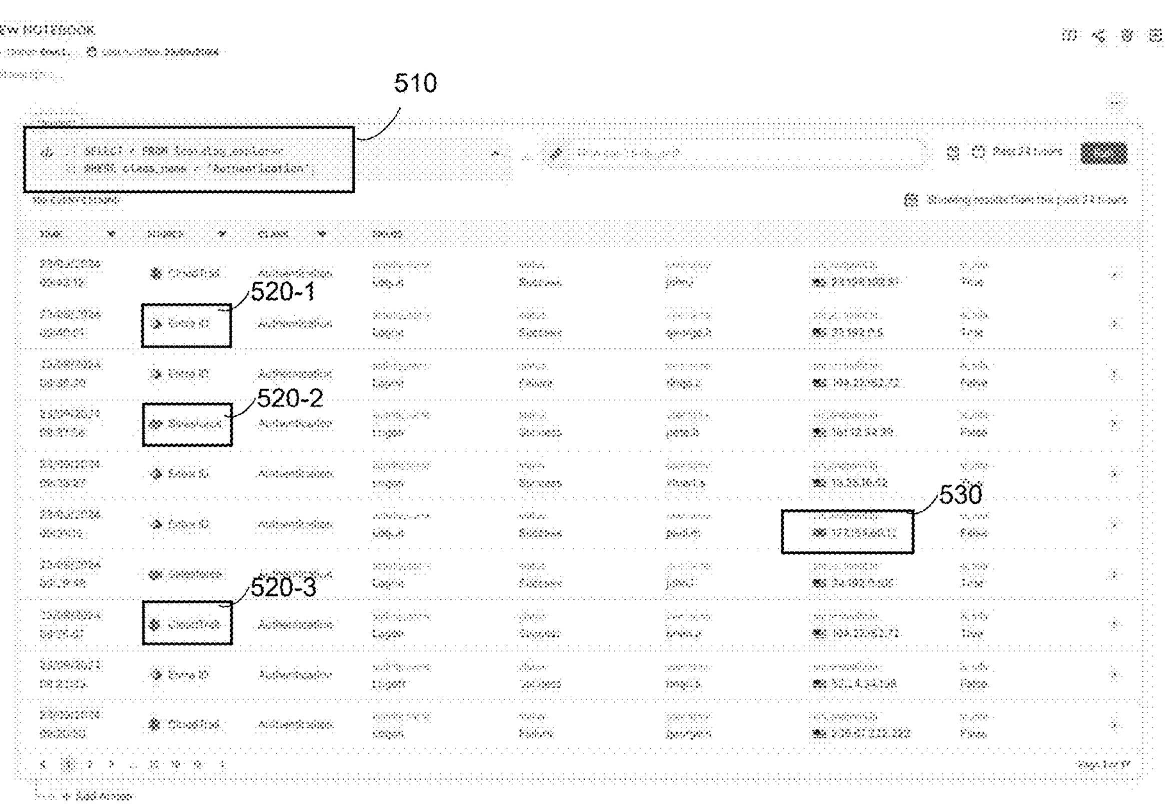
FIG. 5 shows an example screenshot generated by the disclosed system illustrating the results of an input query and information retrieved from multiple CDSs according to an embodiment.

FIG. 5 shows an example screenshot generated by the disclosed system illustrating the results of an input query and information retrieved from multiple CDSs according to an embodiment.

The input query 510 is to select all CDSs connected to the system for all authentication attempts. The query is an SQL query defined as follows:

Select * FROM $catalog_explorer WHERE class_name='Authentication';

The sources (CDSs) 520-1, 520-2, and 520-3 that information is retrieved from include CloudTrail, Entra ID, and Salesforce®. The information retrieved from these sources is displayed in a normalized format, including the time of the logon, activity name, status, username, and source IP of the endpoint if the multi factor authentication (MFA) is activated. It should be noted that the information such information is retrieved from different CDSs, where each CDS saves the information in a different format. The normalization of the data is performed as discussed above. Normalizing the data allows us to identify security threats quickly. For example, label 530 shows that the source IP address is different and may be a threat.

It should be appreciated that the feathered search across multiple sources and providing the information in a normalized way using a single query, provides a security office (a user) the ability to identify or investigate incidents in a more efficient manner. Specifically, the disclosed embodiments eliminate the need to search different CDSs (cyber data sources) individually, saving time and improving efficiency. Further, the disclosed embodiments provide comprehensive results by gathering information from a wide range of CDSs, ensuring a more complete and accurate data set to ensure that a user has a complete picture of ongoing, past, or future incidences. Users (security officers or personnel in the organization) benefit from real-time access to the most up-to-date information without the need to learn multiple search platforms, making it an intuitive and accessible tool for diverse fields, such as research, business, and legal work.

The disclosed embodiments further allow enhanced collaboration by pulling data from various CDSs, enabling more informed decision-making on how to mitigate attacks, weak security areas in the organization, gaps in security in the organization, and so on. With customization options for ranking and displaying results, users can prioritize relevancy, further improving productivity and satisfaction. Overall, the federated search disclosed herein provides a faster, more thorough, and user-friendly search experience across multiple CDSs and platforms.

Figure 6:
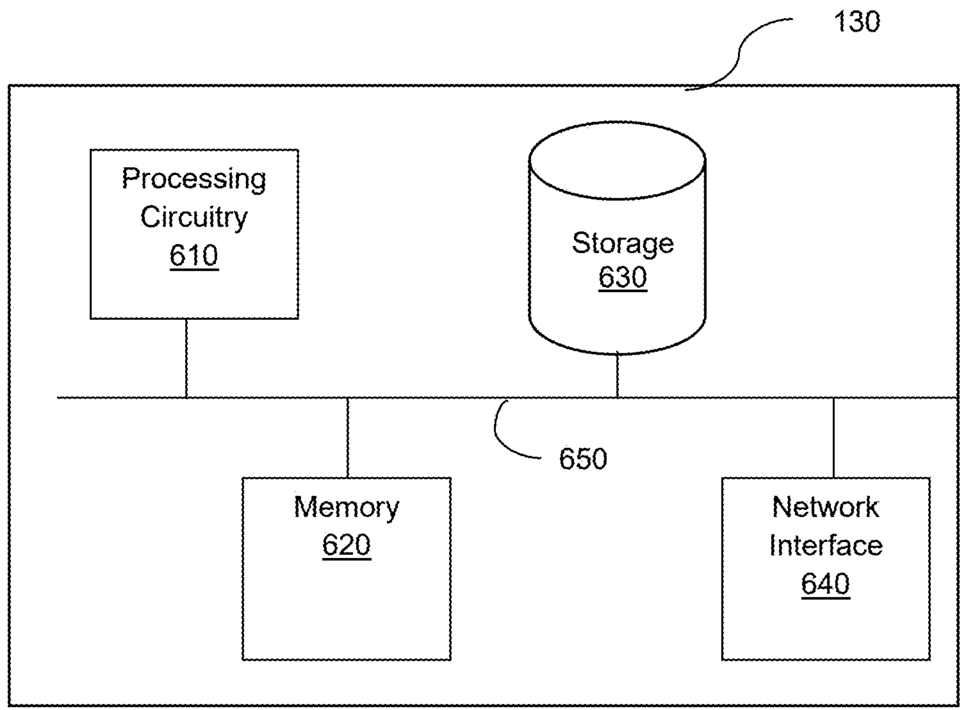
FIG. 6 is an example schematic diagram of a system according to an embodiment.

FIG. 6 is an example schematic diagram of a system 130 according to an embodiment. System 130 includes a processing circuitry 610 coupled to a memory 620, a storage 630, and a network interface 640. In an embodiment, the components of system 130 may be communicatively connected via bus 650.

The processing circuitry 610 may be realized as one or more hardware logic components and circuits. For example, and without limitation, illustrative types of hardware logic components that can be used include field programmable gate arrays (FPGAs), application-specific integrated circuits (ASICs), application-specific standard products (ASSPs), system-on-a-chip systems (SOCs), graphics processing units (GPUs), tensor processing units (TPUs), general-purpose microprocessors, microcontrollers, digital signal processors (DSPs), and the like, or any other hardware logic components that can perform calculations or other manipulations of information.

The memory 620 may be volatile (e.g., random access memory, etc.), non-volatile (e.g., read-only memory, flash memory, etc.), or a combination thereof.

In one configuration, software for implementing one or more embodiments disclosed herein may be stored in the storage 630. In another configuration, the memory 620 is configured to store such software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the processing circuitry 610, cause the processing circuitry 610 to perform the various processes described herein.

The storage 630 may be magnetic storage, optical storage, and the like, and may be realized, for example, as flash memory or other memory technology, compact disk-read-only memory (CD-ROM), or any other medium that can be used to store the desired information.

The network interface 640 allows system 130 to communicate with other systems, devices, components, applications, or other hardware or software components, for example as described herein.

It should be understood that the embodiments described herein are not limited to the specific architecture illustrated in FIG. 6, and other architectures may be equally used without departing from the scope of the disclosed embodiments.

It is important to note that the embodiments disclosed herein are only examples of the many advantageous uses of the innovative teachings herein. In general, statements made in the specification of the present application do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

The various embodiments disclosed herein can be implemented as hardware, firmware, software, or any combination thereof. Moreover, the software may be implemented as an application program tangibly embodied on a program storage unit or computer-readable medium consisting of parts, or of certain devices and/or a combination of devices. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such a computer or processor is explicitly shown. In addition, various other peripheral units may be connected to the computer platform such as an additional data storage unit and a printing unit. Furthermore, a non-transitory computer-readable medium is any computer-readable medium except for a transitory propagating signal.

All examples and conditional language recited herein are intended for pedagogical purposes to aid the reader in understanding the principles of the disclosed embodiment and the concepts contributed by the inventor to furthering the art, and are to be construed as being without limitation to such specifically recited examples and conditions. Moreover, all statements herein reciting principles, aspects, and embodiments of the disclosed embodiments, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It should be understood that any reference to an element herein using a designation such as "first," "second," and so forth does not generally limit the quantity or order of those elements. Rather, these designations are generally used herein as a convenient method of distinguishing between two or more elements or instances of an element. Thus, a reference to the first and second elements does not mean that only two elements may be employed there or that the first element must precede the second element in some manner. Also, unless stated otherwise, a set of elements comprises one or more elements.

As used herein, the phrase "at least one of" followed by a listing of items means that any of the listed items can be utilized individually, or any combination of two or more of the listed items can be utilized. For example, if a system is described as including "at least one of A, B, and C," the system can include A alone; B alone; C alone; 2A; 2B; 2C; 3A; A and B in combination; B and C in combination; A and C in combination; A, B, and C in combination; 2A and C in combination; A, 3B, and 2C in combination; and the like.

What is claimed is:

1. A computer implemented method for a federated search across multiple different SIEM tools connected to a plurality of target data sources, comprising:

receiving an input query at a SIEM federated search engine wherein the input user query is either in a format of an SQL query or a natural language query wherein input query is entered by a user attempting to retrieve information from multiple SIEM tools;

determining, using plurality of potential cyber incident views, target Cyber Data Sources (CDS's) from the plurality of target data sources to query;

determining, using a large language model (LLM), at least one matching cyber-incident view from the plurality of potential cyber incident views to serve an input query, when at least one matching cyber-incident view lists the plurality of target cyber data sources (CDSs), and wherein the matching cyber-incident view is determined based on an incident that a user intends to investigate based on the plurality of potential cyber incident views, wherein the cyber-incident view includes an intermediate view and a normalized view;

querying each of the plurality of target CDSs, wherein each of the plurality of target CDSs is quired with a respective native query, wherein the respective native query corresponds to the input query;

retrieving results from the plurality of target CDSs in response to the respective native query;

normalizing retrieved results based on the matching cyber-incident view, wherein normalized results displayed all the retrieved results, wherein normalizing the retrieved results further comprises:

mapping the retrieved results to an intermediate format using the intermediate view; and mapping the retrieved results from the intermediate format to a normalized format using the normalized view; and displaying the normalized results in unified response to the input query.

2. The method of claim 1, wherein the normalized format is a cybersecurity schema framework Open Cyber Security Schema Framework (OCSF).

3. The method of claim 1, wherein the input query is any one of an SQL query or a natural language query.

4. The method of claim 1, wherein determining at least one matching cyber-incident view further comprises:

analyzing the input query to determine the user intent for the requested results for the incident to be investigated; and identifying a cyber-incident matching the user's purpose for the requested results.

5. The method of claim 1, wherein a cyber-incident view is a standard query language (SQL) view pertaining to the detection and investigation of cyber incidents.

6. The method of claim 5, wherein the cyber incidents include any one of: threat detection, security incidents, compliance, user activity monitoring, network traffic analysis, and vulnerability management.

7. The method of claim 1, further comprising:

correlating the retrieved results to remove duplicated entries.

8. The method of claim 7, further comprising mapping sources in each the Cyber Data Source (CDS) to the intermediate view, wherein the sources include any one of: formats, tables, data locations, schemas, and the like.

9. The method of claim 7, further comprising:

generating the cyber-incident view using at least a retrieval-augmented generation (RAG) process.

10. The method of claim 9, further comprising:

tuning, using an AI model, an output of the RAG process to detect inaccuracy in the cyber-incident view generated using the RAG process.

11. The method of claim 1, wherein querying each of the plurality of target CDSs further comprises:

for each of the plurality of target CDSs, generating the respective native query complaint with a respective target CDS; and querying the respective target CDS with the respective native query.

12. The method of claim 11, wherein generating the respective native query includes converting the input query to the respective native query compliant with specifications of respective target CDS.

13. The method of claim 11, wherein the respective native query includes an API request.

14. A non-transitory computer-readable medium storing a set of instructions for a federated search across multiple different SIEM tools connected to a plurality of target data sources, the set of instructions comprising:

one or more instructions that, when executed by one or more processors of a device, cause the device to:

receive an input query at a SIEM federated search engine wherein the input user query is either in a format of an SQL query or a natural language query wherein input query is entered by a user attempting to retrieve information from multiple SIEM tools;

determine, using plurality of potential cyber incident views, target Cyber Data Sources (CDS's) from the plurality of target data sources to query;

determine, using a large language model (LLM), at least one matching cyber-incident view from the plurality of potential cyber incident views to serve an input query, when at least one matching cyber-incident view lists a plurality of target cyber data sources (CDSs), and wherein the matching cyber-incident view is determined based on an incident that a user intends to investigate based on the plurality of potential cyber incident views, wherein the cyber-incident view includes an intermediate view and a normalized view;

query each of the plurality of target CDSs, wherein each of the plurality of target CDSs is quired with a respective native query, wherein the respective native query corresponds to the input query;

retrieve results from the plurality of target CDSs in response to the respective native query;

normalize retrieved results based on the matching cyber-incident view, wherein normalized results displayed all the retrieved results in a consistent manner, wherein the one or more processors, when normalizing the retrieved results, are configured to:

map the retrieved results to an intermediate format using the intermediate view; and map the retrieved results from the intermediate format to a normalized format using the normalized view; and display the normalized results in response to the input query.

15. A system for a federated search across multiple different SIEM tools connected to a plurality of target data sources, comprising:

one or more processors configured to:

receive an input query at a SIEM federated search engine wherein the input user query is either in a format of an SQL query or a natural language query wherein input query is entered by a user attempting to retrieve information from multiple SIEM tools;

determine, using plurality of potential cyber incident views, target Cyber Data Sources (CDS's) from the plurality of target data sources to query;

determine, using a large language model (LLM), at least one matching cyber-incident view from the plurality of potential cyber incident views to serve an input query, when at least one matching cyber-incident view lists a plurality of target cyber data sources (CDSs), and wherein the matching cyber-incident view is determined based on an incident that a user intends to investigate based on the plurality of potential cyber incident views, wherein the cyber-incident view includes an intermediate view and a normalized view;

query each of the plurality of target CDSs, wherein each of the plurality of target CDSs is quired with a respective native query, wherein the respective native query corresponds to the input query;

retrieve results from the plurality of target CDSs in response to the respective native query, normalize retrieved results based on the matching cyber-incident view, wherein normalized results displayed all the retrieved results in a consistent manner, wherein the one or more processors, when normalizing the retrieved results, are configured to:

map the retrieved results to an intermediate format using the intermediate view; and map the retrieved results from the intermediate format to a normalized format using the normalized view; and display the normalized results in response to the input query.

16. The system of claim 15, wherein a cyber-incident view is an SQL view pertaining to detection and investigation of cyber incidents.

17. The system of claim 16, wherein the cyber incidents include any one of:

threat detection, security incidents, compliance, user activity monitoring, network traffic analysis, and vulnerability management.

18. The system of claim 15, wherein the one or more processors are further configured to:

correlate the retrieved results to remove duplicated entries.

19. The system of claim 18, wherein the normalized format is an Open cybersecurity schema framework (OCSF).

20. The system of claim 18, wherein mapping sources in each CDS to an intermediate view, sources include any one of:

formats, tables, data locations, schemas, and the like.

21. The system of claim 18, wherein the one or more processors are further configured to:

generate the cyber-incident view using at least a retrieval-augmented generation (RAG) process.

22. The system of claim 21, wherein the one or more processors are further configured to:

tune, using an AI model, an output of the RAG process to detect inaccuracy in cyber-incident views generated using the RAG process.

23. The system of claim 15, wherein the one or more processors, when querying each of the plurality of target CDSs, are configured to:

for each of the plurality of target CDSs, generate the respective native query complaint with a respective target CDS; and query the respective target CDS with the respective native query.

24. The system of claim 23, wherein generating the respective native query includes converting the input query to the respective native query compliant with specifications of respective target CDS.

25. The system of claim 23, wherein the respective native query includes an API request.

26. The system of claim 23, wherein the input query is any one of an SQL query or a natural language query.

27. The system of claim 23, wherein the one or more processors, when determining at least one matching cyber-incident view, are configured to:

analyze the input query to determine the user intent for the requested results for the incident to be investigated; and identify a cyber-incident matching the user's purpose for the requested results.

* * * * *